No. 730,454. PATENTED JUNE 9, 1903.
A. A. GURTNER.
PROCESS OF PRODUCING COLORED PHOTOGRAPHS.
APPLICATION FILED AUG. 11, 1902.
NO MODEL.
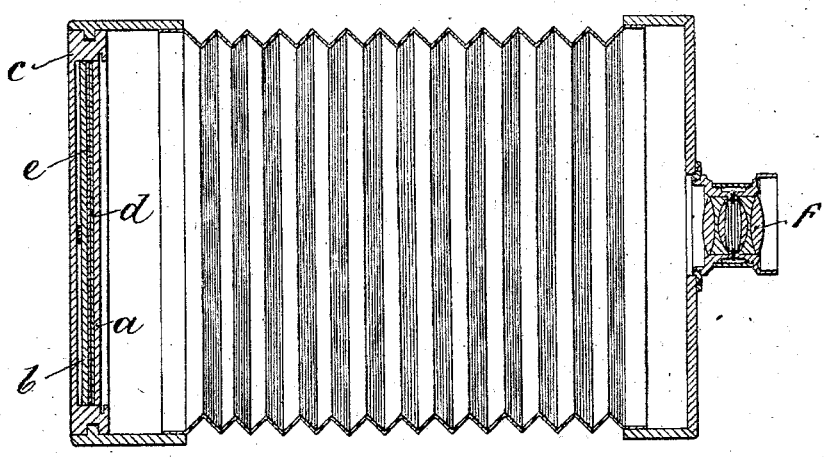

No. 730,454.

Patented June 9, 1903.

UNITED STATES PATENT OFFICE.

ADOLF ALFRED GURTNER, OF BERN, SWITZERLAND.

PROCESS OF PRODUCING COLORED PHOTOGRAPHS.

SPECIFICATION forming part of Letters Patent No. 730,454, dated June 9, 1903.

Application filed August 11, 1902. Serial No. 119,330. (No specimens.)

*To all whom it may concern:*

Be it known that I, ADOLF ALFRED GURTNER, architect, a citizen of Switzerland, residing at Bern, Switzerland, have invented certain new and useful Improvements in Processes of Producing Colored Photographs; and I do hereby declare the following to be a full, clear, and exact description of the invention, such as will enable others skilled in the art to which it appertains to make and use the same.

The present invention relates to the production of colored photographs by taking two negatives of the object, one of them through a light-filter on an orthochromatic plate, using a light-filter for yellowed light. From the latter negative a copy is produced that is subjected to blue a toning or in consequence of the particular method of its preparation will assume a blue tone. From the other negative a copy is made upon a film that has the property to assume a color of yellow to yellow red or red. The process can be accomplished by a single exposure by using suitably-prepared plates. I prefer the latter process, which is carried out, *e. g.*, as follows: An ordinary sensitive plate, such as is commonly sold on the market, (it may be a silver chlorid or a silver-chlorid-bromid plate,) is soaked in an aqueous solution of anilin orange until it is colored deep orange and then dried. This plate is then placed film to film on an orthochromatic plate whose sensitiveness for yellow and red predominates. Both plates are placed in the plate-holder, so that the anilin-colored plate has its glass side turned toward the lens. Care, however, must be taken that the films are in contact over their entire surfaces in order to obtain sharp negatives. The colored plate acts as a light-filter to the orthochromatic plate behind it, so that the latter will be influenced by red and yellow rays that pass through the filter, and the other plate will be especially influenced by the blue rays. Upon developing the two plates there will be two negatives, one serving to produce an orange-colored print and the other a blue-colored print, which prints when superposed produce a picture in colors. The selection of plates must be such that when the orthochromatic plate is fully exposed the colored plate is not overexposed.

Practical experience has shown that when using the most rapid orthochromatic plate the speed of the colored plate should be such that it is slightly underexposed when the orthochromatic plate has normal exposure or slight over-exposure. The two exposed plates can be developed in any suitabe developer—for example, rodinal. As a fixing-bath a comparatively dilute solution, one to five, of sodium thiosulfate (hypo) is suitable. The negative can be copied on transparent plates or on paper. If the negatives are to make a picture on glass, then the orthochromatic negative is copied on a silver-chlorid-bromid plate and the latter developed and fixed as usual. In development I try to produce a weak but contrasty negative.

As a developer the following is recommended: (1) three hundred grams of neutral potassium oxalate dissolved in one liter of water; (2) three hundred grams ferrous sulfate (green vitrol) chemically pure dissolved in a liter of water, to which is added a few drops of a solution of citric acid. Of these solutions mix three parts of 1 with one part of 2 and to the mixture add a few drops of restrainer, ten per cent. of alkali, (bromid solution.) The finished well-washed plate is then colored or toned blue, and for this purpose the following solutions, mixed in equal parts, are used: (A) five grams potassium ferricyanid dissolved in three hundred grams of distilled water; (B) five grams of ferric chlorid, 1.5 grams of ammonium oxalate, and three hundred grams of distilled water. After being colored in this bath the plate is washed in a strong current of flowing water and finally in a ten-per-cent. hydrochloric acid to remove the superficial blue coating. After this the plate is again well washed. The coloring-bath will be dispensed with when plates are used that copy blue. This will be the case when a gelatin film is treated with the following: fifteen grams of potassium ferricyanid, one hundred and twenty grams of water, twenty-three grams of ferric ammonium citrate, and one hundred and twenty grams of water. After printing it is only necessary to wash in water.

The negative obtained without the light-filter can be printed on a sensitized celloidin paper, from which the film can be stripped, or on a diapositive plate. In the former case I have found the paper of Schütze & Noak, of Hamburg, well adapted to the use. It has the property of taking a light-yellow to red-yellow color after being fixed. The picture prints out on this paper in strong bronze tones. It is then washed several minutes in water and then treated in a fifteen-per-cent. sodium thiosulfate (hypo) bath for ten minutes and then washed about one hour in running water. The film is then softened in warm water (about 30° to 50° centigrade) and placed in register on the blue plate under water and then dried in a place free from dust. The dried films represent objects in substantially their correct colors.

If it is desired to dispense with the transference and registration of one film upon another, the second print can be made directly on an aristotype plate that will assume the same color as the above-described paper. The finished plate is then laid film to film on the blue plate and the two plates bound together and held in register by any suitable means. If it is desired to make pictures on paper, the negative made on the isochromatic plate is printed on silver-chlorid gelatin paper, which can be treated in the same manner as the blue plate above described except that it is hardened in a twenty-per-cent. alum bath just before drying. The print is then mounted. It is wetted with a sponge and the yellowish-red print on celloidin paper registered on it and the superfluous water absorbed with blotting-paper. Prints thus made appear in fairly-correct colors.

If films are to be used for the negatives instead of glass plates, then two exposures are necessary, one with and one without a ray-filter, and the films must be orthochromatic.

In the accompanying drawing I have shown so much of a camera as will be necessary to an understanding of the relative arrangement of the plates, $a$ indicating the anilin-colored plate, $b$ the achromatic plate in slide $c$ with its film $e$ in contact with the film $d$ of plate $a$, the glass back of the latter facing the lens $f$.

Having thus described my said invention, what I claim as new therein, and desire to secure by Letters Patent, is—

1. The process of making colored photographs, which consists in making two negatives of the same object, one on an orthochromatic plate with the use of a light-filter, obtaining a print in blue from the latter negative and superposing on this print, a print from the former negative and having a color from yellow to red, substantially as described.

2. The process of making colored photographs, which consists in coloring a sensitized plate or film and placing the colored sensitized coating against the sensitized surface of another plate or film, simultaneously exposing both plates or films and developing them to produce two negatives, obtaining a blue-colored print from the negative on the latter plate and superposing upon it a transparent print from the former negative, colored from yellow to red, substantially as described.

3. The process of simultaneously obtaining registrable negatives, which consists in placing two suitably-supported sensitized films in contact and simultaneously exposing them in a camera and suitably developing the films, substantially as described.

4. The process of simultaneously obtaining registrable negatives, which consists in placing two suitably-supported sensitized films of different rapidity in contact, simultaneously exposing and separately developing them, substantially as described.

5. The process of simultaneously obtaining registrable negatives of different color values, which consists in placing a colored sensitized film in contact with an orthochromatic film, simultaneously exposing and separately developing the films, substantially as described.

6. The process of simultaneously obtaining two registrable negatives of different color values, which consists in placing a sensitized medium stained yellow on an orthochromatic sensitized medium, simultaneously exposing and then developing the media, substantially as described.

7. The process of simultaneously obtaining two registrable negatives, which consists in staining a sensitive film, with analin orange, placing the film on an orthochromatic film, simultaneously exposing and separately developing said films, substantially as described.

8. The process of making colored photographs by simultaneously producing two suitable registrable negatives, producing a print in blue and registering thereon, a print on celloidin colored from yellow to yellow red, substantially as described.

9. The process of making colored photographs, which consists in placing an orange-colored film on an orthochromatic film and simultaneously exposing both of said films, developing and fixing the negatives, producing a blue-colored print from the negative from the latter film with an iron salt and floating on this print a print colored from yellow to orange on a celloidin film, substantially as described.

In testimony that I claim the foregoing as my invention I have signed my name in presence of two subscribing witnesses.

ADOLF ALFRED GURTNER.

Witnesses:
G. MARCHAUD,
J. C. HEUBERGER.